US011026027B2

United States Patent
Shriner et al.

(10) Patent No.: US 11,026,027 B2
(45) Date of Patent: Jun. 1, 2021

(54) EAR-WORN ELECTRONIC DEVICE INCORPORATING AN ANTENNA ACTIVELY LOADED USING A NON-FOSTER CIRCUIT

(71) Applicant: Starkey Laboratories, Inc., Eden Prairie, MN (US)

(72) Inventors: Paul Anders Shriner, Hopkins, MN (US); Ezdeen Elgahannai, Eden Prairie, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 0 days.

(21) Appl. No.: 16/408,957

(22) Filed: May 10, 2019

(65) Prior Publication Data
US 2020/0359141 A1 Nov. 12, 2020

(51) Int. Cl.
H04R 25/00 (2006.01)
H04B 1/40 (2015.01)
H01Q 1/24 (2006.01)
H04R 1/10 (2006.01)

(52) U.S. Cl.
CPC .......... *H04R 25/554* (2013.01); *H01Q 1/241* (2013.01); *H04B 1/40* (2013.01); *H04R 1/1058* (2013.01)

(58) Field of Classification Search
CPC ...... H04R 25/00; H04R 25/55; H04R 25/558; H04R 25/60; H04R 1/105
USPC ................. 381/312–315, 324, 331, 380–381
See application file for complete search history.

(56) References Cited

U.S. PATENT DOCUMENTS

| 6,121,940 | A  | 9/2000  | Skahill et al. |
| 6,778,017 | B2 | 8/2004  | Analui et al. |
| 7,898,493 | B1 | 3/2011  | Rojas et al. |
| 8,718,304 | B2 | 5/2014  | Pedersen |
| 9,407,239 | B2 | 8/2016  | White et al. |
| 9,825,659 | B2 | 11/2017 | Robey et al. |
| 9,960,484 | B2 | 5/2018  | Chieh et al. |
| 10,283,851 | B2 | 5/2019 | Church et al. |
| 10,448,137 | B1 | 10/2019 | Lin et al. |

(Continued)

FOREIGN PATENT DOCUMENTS

| WO | 2013006732    | 1/2013 |
| WO | 2013006732 A3 | 1/2013 |

(Continued)

OTHER PUBLICATIONS

Elghannah et al., "Design of Electrically Small Antennas with Multiport Non-Foster Loading using Network Characteristics Modes", USNC/URSI National Radio Science Meeting, 2011.

(Continued)

*Primary Examiner* — Suhan Ni
(74) *Attorney, Agent, or Firm* — Shumaker & Sieffert, P.A.

(57) ABSTRACT

An ear-worn electronic device is configured to be worn by a wearer and comprises a housing configured to be supported by, at, in or on an ear of the wearer. Electronic circuitry is disposed in the housing and comprises a radio frequency transceiver and a power source. An antenna is disposed in, on, or extending from the housing and operably coupled to the transceiver. A non-Foster circuit is operably connected to the antenna and coupled to the power source. The non-Foster circuit is configured to actively load the antenna and provide a negative reactance that offsets a reactance of the antenna.

19 Claims, 11 Drawing Sheets

(56) References Cited

U.S. PATENT DOCUMENTS

| | | | |
|---|---|---|---|
| 10,624,032 | B2 | 4/2020 | Seel et al. |
| 2011/0165853 | A1 | 7/2011 | Robert et al. |
| 2011/0170723 | A1* | 7/2011 | Ryann ............... A44C 7/00 |
| | | | 381/322 |
| 2013/0293435 | A1 | 11/2013 | White et al. |
| 2015/0318607 | A1 | 11/2015 | Chieh et al. |
| 2017/0069967 | A1* | 3/2017 | Shrekenhamer ......... H01Q 1/28 |
| 2018/0123567 | A1 | 5/2018 | Hu et al. |
| 2018/0212319 | A1 | 7/2018 | White |
| 2020/0107141 | A1 | 4/2020 | Kvist et al. |

FOREIGN PATENT DOCUMENTS

| | | |
|---|---|---|
| WO | 2013006740 | 1/2013 |
| WO | 2013006740 A3 | 1/2013 |
| WO | 2013152141 | 10/2013 |
| WO | 2013152141 A1 | 10/2013 |

OTHER PUBLICATIONS

Response to Office Action dated Apr. 24, 2020, from U.S. Appl. No. 16/445,933, filed Jul. 22, 2020, 12 pp.

Office Action from U.S. Appl. No. 16/445,933, dated Apr. 24, 2020, 18 pp.

Office Action from U.S. Appl. No. 16/445,933, dated Aug. 21, 2020, 20 pp.

U.S. Appl. No. 16/445,933, filed May 10, 2019, by Shriner et al.

Elghannai et al., "Antenna Design Method Based of The Theory of Characteristic Modes and Non-Foster Reactive Loading", CERF Annual Meeting, 2013.

Elghannai et al., "Design of Electrically Small Antennas with Multiport Non-Foster Loading using Network Characteristics Modes", USNC/URSI National Radio Science Meeting, 2011.

Jacob, "Non-Foster Circuits for High Performance Antennas: Advantages and Practical Limitations", 2016, 113 pages.

Koulouridis et al., "Non-Foster Circuits for Small Broadband Antennas", IEEE, 2009, 4 pages.

Rojas et al., "Distributed Impedance Matching with Foster and Non-Foster Elements", 7th European Conference on Antennas and Propagation, 2013 4 pages.

Razavi, "A Circuit for All Seasons", IEEE Solid-State Circuits Magazine, Summer 2014, pp. 7-10.

Song, "Non-Foster Impedance Matching and Loading Networks for Electrically Small Antennas", 2011, 164 pages.

Stearns, "Non-Foster Circuits and Stability Theory", 2011 IEEE International Symposium on Antennas and Propagation, 2011, 4 pages.

Sussman-Fort et al., "Non-Foster Impedance Matching of Electrically-Small Antennas", IEEE Transactions on Antennas and Propagation, vol. 57, No. 8, Aug. 2009, pp. 2230-2241.

White, "A Variable Negative-Inductance Integrated Circuit at UHF Frequencies", IEEE Microwave and Wireless Components Letters, vol. 22, No 1, Jan. 2012, pp. 35-37.

* cited by examiner

EAR-WORN ELECTRONIC DEVICE INCORPORATING AN ANTENNA ACTIVELY LOADED USING A NON-FOSTER CIRCUIT

TECHNICAL FIELD

This application relates generally to ear-worn electronic devices, including hearing devices, hearing aids, personal amplification devices, and other hearables.

BACKGROUND

Hearing devices provide sound for the wearer. Some examples of hearing devices are headsets, hearing aids, speakers, cochlear implants, bone conduction devices, and personal listening devices. For example, hearing aids provide amplification to compensate for hearing loss by transmitting amplified sounds to a wearer's ear canals. Hearing devices may be capable of performing wireless communication with other devices, such as receiving streaming audio from a streaming device via a wireless link. Wireless communication may also be performed for programming the hearing device and transmitting information from the hearing device. For performing such wireless communication, hearing devices such as hearing aids can include a wireless transceiver and an antenna.

SUMMARY

Embodiments are directed to an ear-worn electronic device configured to be worn by a wearer and comprising a housing configured to be supported by, at, in or on an ear of the wearer. Electronic circuitry is disposed in the housing and comprises a radio frequency transceiver and a power source. An antenna is disposed in, on, or extending from the housing and operably coupled to the transceiver. A non-Foster circuit is operably connected to the antenna and coupled to the power source. The non-Foster circuit is configured to actively load the antenna and provide a negative reactance that offsets a reactance of the antenna.

Embodiments are directed to an ear-worn electronic device configured to be worn by a wearer and comprising a housing configured to be supported at, by, in or on the wearer's ear. A processor and a power source are disposed in the housing. A speaker or a receiver is coupled to the processor. A radio frequency transceiver is disposed in the housing and coupled to the processor. A planar inverted-F antenna is disposed in, on, or extending from the housing and operably coupled to the transceiver. The planar inverted-F antenna comprises a radiating patch having a first end connected to a shorting member and an opposing second end. The shorting member is connected to a ground plane and a feed arm is spaced from the shorting member and connected to the patch and the ground plane. A dielectric is disposed between the patch and the ground plane. A non-Foster circuit is operably connected to the antenna and the power source. The non-Foster circuit is configured to actively load the antenna and provide a negative reactance that offsets a reactance of the antenna.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
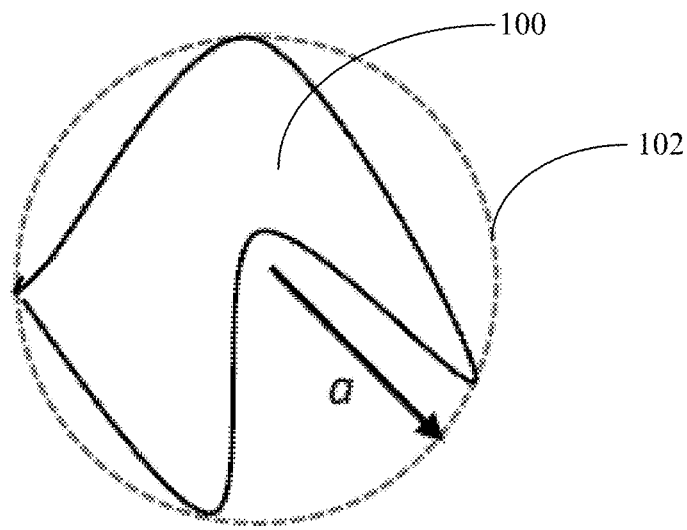
FIG. 1 shows an arbitrary antenna enclosed in a sphere of radius a for purposes of describing an electrically small antenna in accordance with any of the embodiments disclosed herein.

It is understood that the embodiments described herein may be used with any ear-worn or ear-level electronic device without departing from the scope of this disclosure. The devices depicted in the figures are intended to demonstrate the subject matter, but not in a limited, exhaustive, or exclusive sense. Ear-worn electronic devices (also referred to herein as "hearing devices"), such as hearables (e.g., wearable earphones, ear monitors, and earbuds), hearing aids, hearing instruments, and hearing assistance devices, typically include an enclosure, such as a housing or shell, within which internal components are disposed. Typical components of a hearing device can include a processor (e.g., a digital signal processor or DSP), memory circuitry, power management circuitry, one or more communication devices (e.g., a radio, a near-field magnetic induction (NFMI) device), one or more antennas, one or more microphones, and a receiver/speaker, for example. Hearing devices can incorporate a long-range communication device, such as a Bluetooth® transceiver or other type of radio frequency (RF) transceiver. A communication device (e.g., a radio or NFMI device) of a hearing device can be configured to facilitate communication between a left ear device and a right ear device of the hearing device.

Hearing devices of the present disclosure can incorporate an antenna coupled to a high-frequency transceiver, such as a 2.4 GHz radio. The RF transceiver can conform to an IEEE 802.11 (e.g., WiFi®) or Bluetooth® (e.g., BLE, Bluetooth® 4. 2 or 5.0) specification, for example. It is understood that hearing devices of the present disclosure can employ other transceivers or radios, such as a 900 MHz radio. Hearing devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing devices of the present disclosure can be configured to effect bi-directional communication (e.g., wireless communication) of data with an external source, such as a remote server via the Internet or other communication infrastructure. Hearing devices that include a left ear device and a right ear device can be configured to effect bi-directional communication (e.g., wireless communication) therebetween, so as to implement ear-to-ear communication between the left and right ear devices.

The term hearing device of the present disclosure refers to a wide variety of ear-level electronic devices that can aid a person with impaired hearing. The term hearing device also refers to a wide variety of devices that can produce processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device," which is understood to refer to a system comprising a single left ear device, a single right ear device, or a combination of a left ear device and a right ear device.

Ear-worn electronic devices configured for wireless communication, such as hearing aids and other types of hearing devices, can be relatively small in size. Custom hearing devices, such as ITE, ITC, and CIC devices for example, are quite small in size. In the manufacture of a custom hearing device, for example, an ear impression or ear mold is taken for a particular wearer and processed to construct the housing of the hearing device. Because custom hearing devices are designed to be partially or fully inserted into a wearer's ear canal, the housing is necessarily quite small. In order to implement a functional wireless platform (e.g., @2.4 GHz), the antenna must be small enough to fit within such devices. The severe space limitations within the housing of an ear-worn electronic device impose a physical challenge on designing the antenna.

An antenna designed for use in an ear-worn electronic device (or a relatively small body-worn electronic device) is typically defined as a small antenna (e.g., electrically small antenna). A small antenna is one in which its maximum dimension is smaller than the radianlength, where the radianlength is defined as the wavelength divided by $2\pi$. The performance of a small antenna has a fundamental limitation based on its physical and electrical size. As the antenna gets smaller with respect to its operating wavelength, the frequency bandwidth gets smaller and the radiation efficiency drops.

FIG. 1 shows an arbitrary antenna 100 enclosed in a sphere 102 of radius a. In this illustrative example, the antenna 100 has a center operating frequency $f_c$ with a corresponding wavelength $\lambda$. This wavelength $\lambda$ corresponds to a known wavenumber k, given by $k=2\pi/\lambda$. An antenna is considered to be electrically small if the product ka is less than 0.5. Of particular interest is the issue of how far away from $f_c$ can the antenna operate before the antenna performance starts to degrade.

Figure 2:
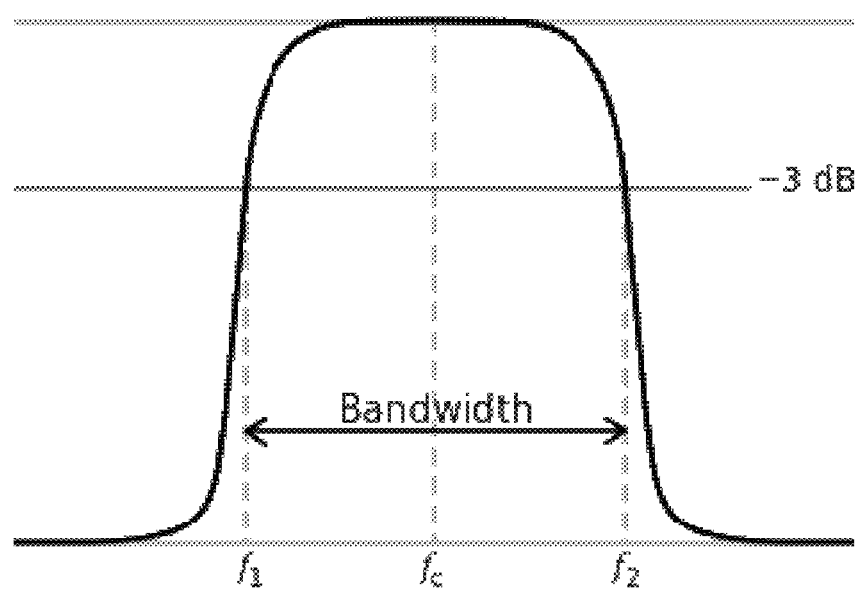
FIG. 2 shows a traditional method for evaluating the bandwidth of an antenna for purposes of describing an electrically small antenna in accordance with any of the embodiments disclosed herein.

FIG. 2 shows a traditional method for defining the bandwidth of an antenna. The bandwidth is defined as the difference of $f_1$ and $f_2$, where $f_1$ and $f_2$ are respectively the lower and upper frequencies where the output (accepted or radiated power) is half or 3 dB down from $f_c$. The quality, Q, of the antenna is dependent on not only the bandwidth, but also the enter operating frequency, $f_c$. This quality factor is given by $$Q = \frac{f_c}{f_2 - f_1}.$$

As the antenna bandwidth increases, the Q must decrease, and vice versa. Another method for defining the bandwidth of an antenna involves the use of the reflection coefficient, S11. In this second method, an S11 is chosen, 6 dB for example, and the bandwidth is defined as the frequency range for which the S11 is below this value. This second method is what is used to calculate the bandwidths shown in FIGS. 10A and 10B.

Figure 3:
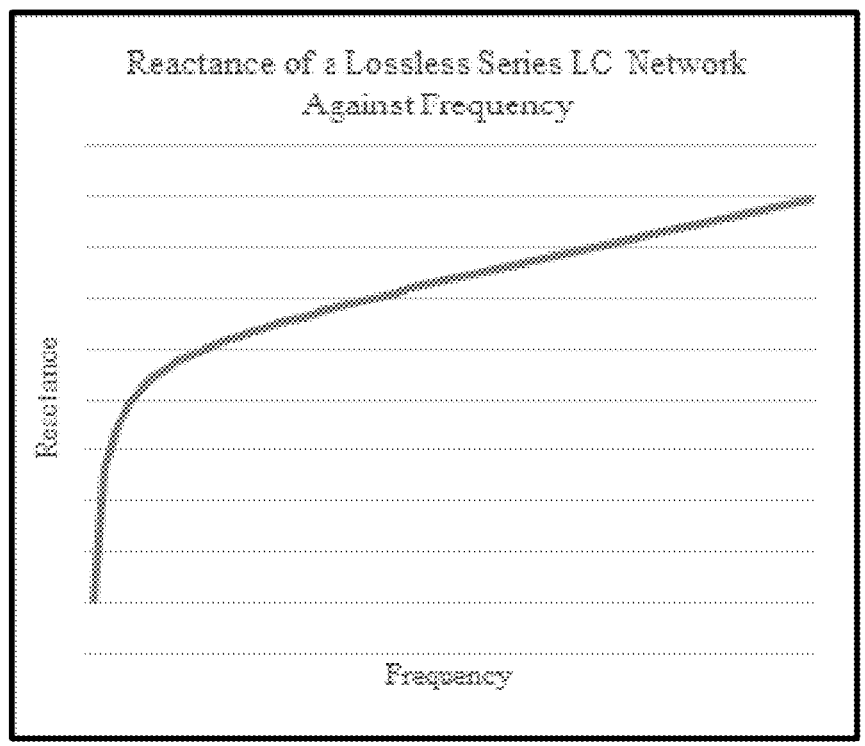
FIGS. 3 and 4 are graphs showing reactance versus frequency for simple series LC and parallel LC networks, respectively.
Figure 4:
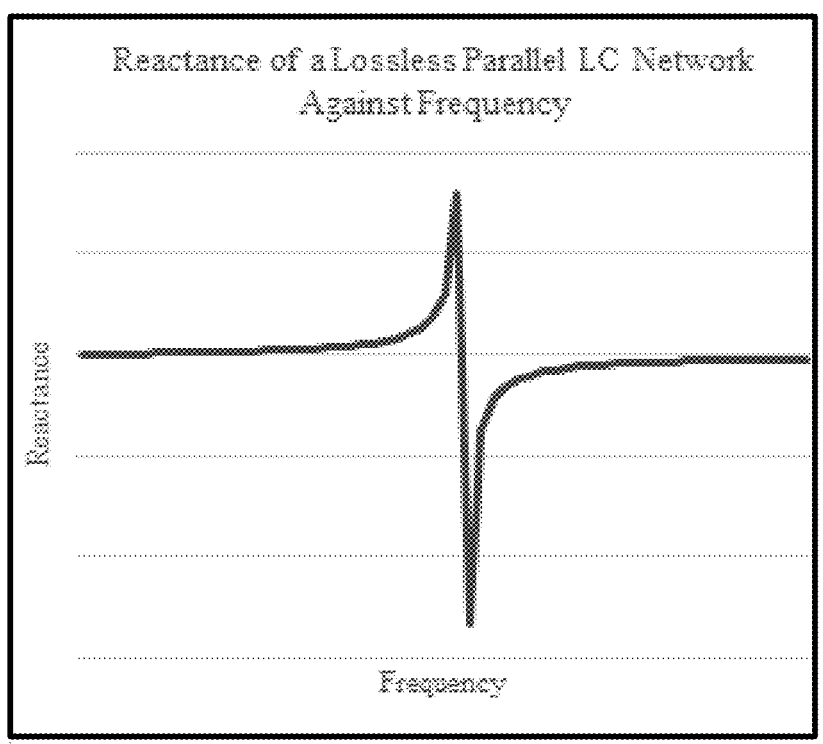

Traditional resonant circuits have a set of inductors and capacitors that are chosen to cancel out their reactances at a given frequency. Graphs of simple topologies, series LC network and parallel LC network, are shown in FIGS. 3 and 4, respectively. The reactances for these topologies are given by $$X_{series} = \omega L - \frac{1}{\omega C} \text{ (Figure 3) and } X_{parallel} = \frac{\omega L}{1 - \omega^2 LC} \text{ (Figure 4)}.$$

It is noted that inductive reactance is given by $\omega L$ and capacitive reactance is given by $1/(\omega C)$. By implementing more elements, a wider band of frequencies can be resonated out. However, this approach is limited, as many elements would be needed to create resonance over what is typically needed for wideband applications. All passive electrically small antennas have a fundamental gain-bandwidth limitation related to their electrical size. Also, the maximum radiation power factor of such an antenna is equivalent to the inverse of the minimum quality factor of the antenna.

Embodiments of the disclosure are directed to an antenna arrangement of a hearing device comprising an antenna loaded with an active non-Foster circuit (NFC). An NFC can be configured to resonate the antenna of a hearing device across a wide frequency bandwidth (e.g., create a wideband resonance). An NFC is a type of active circuit that does not follow Foster's reactance theorem. This theorem states that the reactance of a passive, lossless two-terminal (one-port) network always strictly monotonically increases with frequency. In a circuit that obeys Foster's reactance theorem, the reactances of inductors and capacitors individually increase with frequency. According to Foster's reactance theorem, all lossless passive two-terminal devices must have an impedance with a reactance and susceptance that has a positive slope with frequency. An element or circuit that violates this property by having a reactance which has a negative slope with frequency is called a "non-Foster" element or circuit. As such, the term NFC used herein refers to an active circuit or element that does not obey Foster's reactance theorem.

Figure 5:
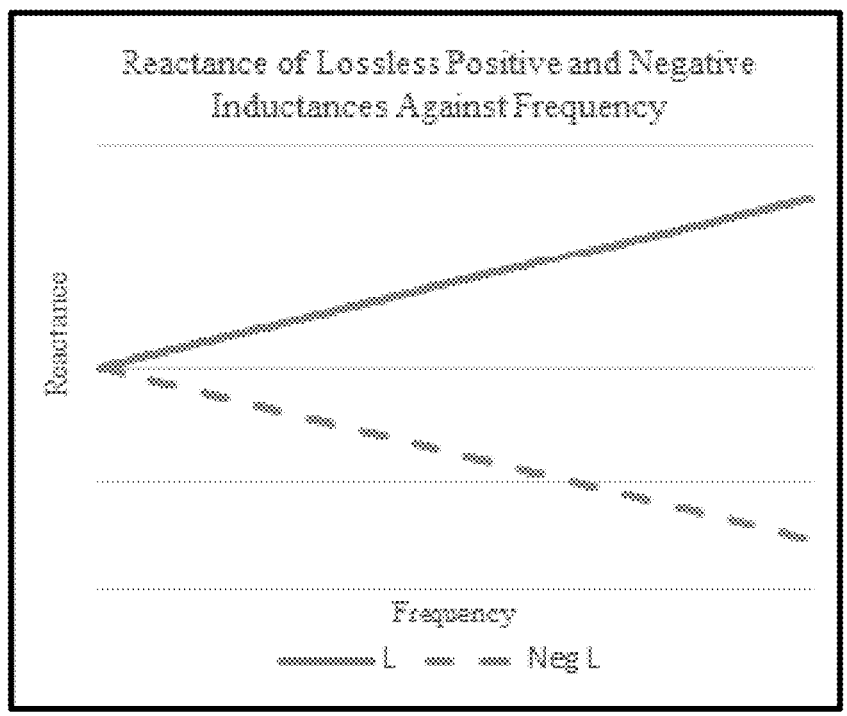
FIG. 5 is a graph showing the reactance of lossless positive and negative inductances versus frequency.
Figure 6:
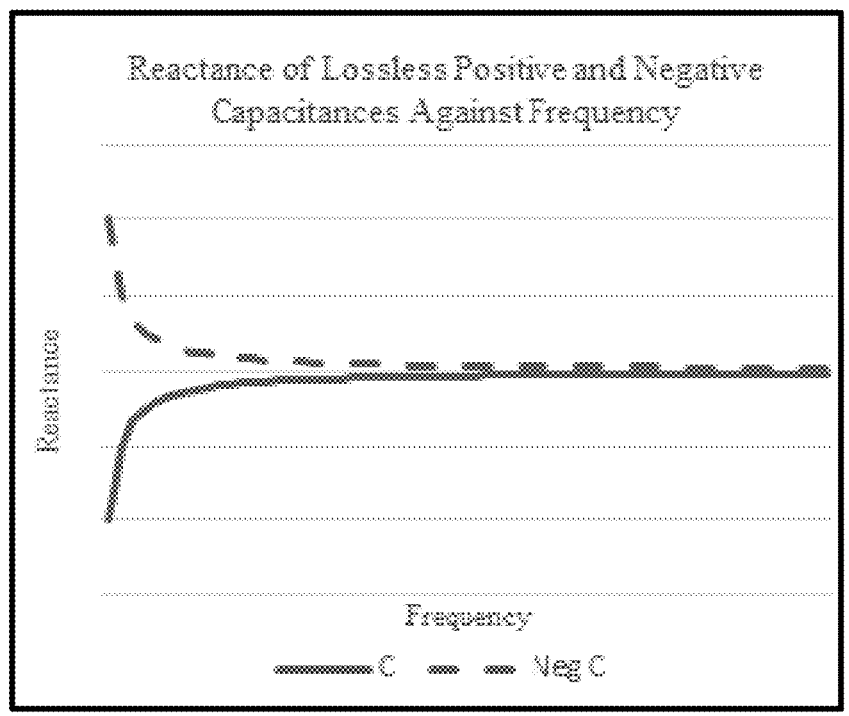
FIG. 6 is a graph showing the reactance of lossless positive and negative capacitances versus frequency.

The fundamental gain-bandwidth limitation of electrically small antennas used in ear-worn (and body-worn) electronic devices can be overcome by loading the antenna with an active non-Foster circuit (e.g., one or more negative inductors and/or one or more negative capacitors). As is shown in FIGS. 5 and 6 (dashed lines), active NFCs have a negative reactance vs. frequency slope. NFCs can be considered to act as a negative inductor or a negative capacitor. FIG. 5 is a graph showing the reactance of lossless positive (+L, solid line) and negative (−L, dashed line) inductances versus frequency. The reactance for a negative inductor can be characterized as $X_{ind}=-\omega|L|$, where the inductance, L, is expressed as an absolute value for purposes of clarity. FIG. 6 is a graph showing the reactance of lossless positive (+C, solid line) and negative (−C, dashed line) capacitances versus frequency. The reactance for a negative capacitor can be characterized as $$X_{cap} = \frac{1}{\omega|C|},$$

where the capacitance, C, is expressed as an absolute value for purposes of clarity.

The graphs shown in FIGS. 5 and 6 demonstrate that non-Foster circuits can be used to cancel out a positive sloped reactance over a wide band of frequencies, as opposed to a single frequency for traditional resonators using passive inductors and capacitors. Non-Foster reactances with a negative frequency slope can be used to completely cancel equivalent Foster reactances with a positive frequency slope. As such, NFCs can be used to load an antenna of an ear-worn or body-worn electronic device to achieve very high bandwidths not possible using only passive inductors and capacitors. For example, an NFC can be configured to actively load the antenna so as to achieve a bandwidth beyond a Bode-Fano limit.

Figure 7A:
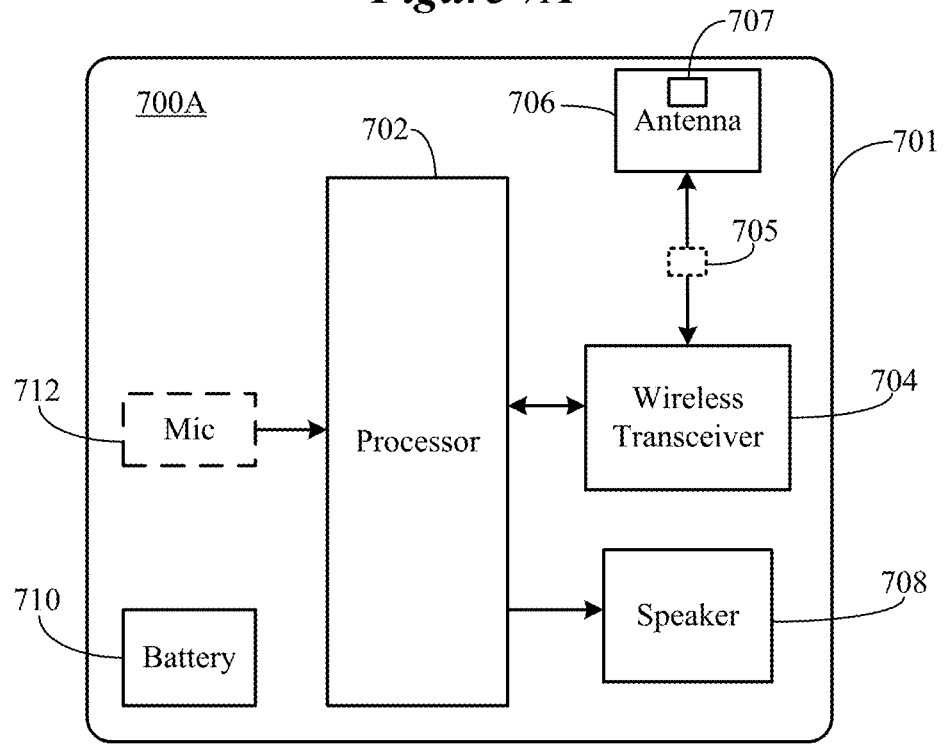
FIGS. 7A and 7B illustrate an ear-worn electronic device arrangement incorporating an antenna loaded with a non-Foster circuit in accordance with any of the embodiments disclosed herein.
Figure 7B:
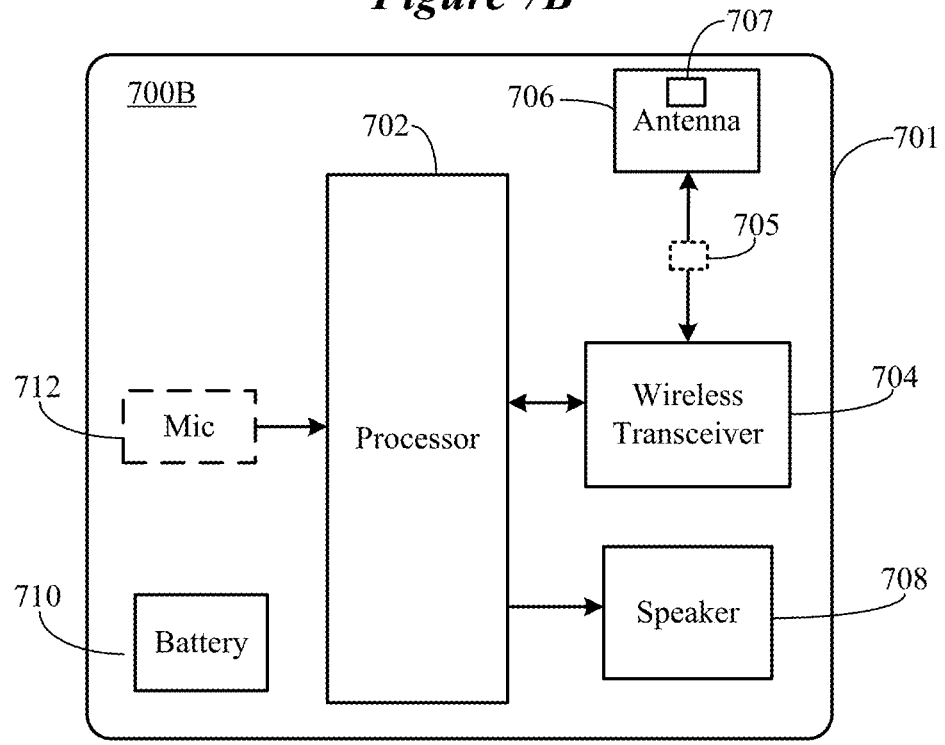

Embodiments are directed to use of an NFC as an embedded element within an antenna of an ear-worn or body-worn electronic device to create a wideband and efficient response, while being able to reduce the physical size of the antenna. FIGS. 7A and 7B illustrate various components of a representative hearing device arrangement in accordance with any of the embodiments disclosed herein. FIGS. 7A and 7B illustrate first and second hearing devices 700A and 700B configured to be supported at, by, in or on left and right ears of a wearer. In some embodiments, a single hearing device 700A or 700B can be supported at, by, in or on the left or right ear of a wearer. As illustrated, the first and second hearing devices 700A and 700B include the same functional components. It is understood that the first and second hearing devices 700A and 700B can include different functional components. The first and second hearing devices 700A and 700B can be representative of any of the hearing devices disclosed herein.

The first and second hearing devices 700A and 700B include an enclosure 701 configured for placement, for example, over or on the ear, entirely or partially within the external ear canal (e.g., between the pinna and ear drum) or behind the ear. Disposed within the enclosure 701 is a processor 702 which incorporates or is coupled to memory circuitry. The processor 702 can include or be implemented as a multi-core processor, a digital signal processor (DSP), an audio processor or a combination of these processors. For example, the processor 702 may be implemented in a variety of different ways, such as with a mixture of discrete analog and digital components that include a processor configured to execute programmed instructions contained in a processor-readable storage medium (e.g., solid-state memory, e.g., Flash).

The processor 702 is coupled to a wireless transceiver 704 (also referred to herein as a radio), such as a BLE transceiver. The wireless transceiver 704 is operably coupled to an antenna 706 configured for transmitting and receiving radio signals. In this and other embodiments, the antenna 706 can be situated within the enclosure 701 (e.g., partially or entirely), on the enclosure 701 (e.g., partially or entirely on an exterior enclosure surface), or extend from the enclosure 701 (e.g., via a pull-cord or pull-cord loop). The antenna 706, according to various embodiments, is loaded using an NFC 707 (or multiple NFCs 707). The NFC 707 is an embedded element within or otherwise connected to the antenna 706. In some configurations, a matching network 705 can be implemented between the antenna 706 and the wireless transceiver 704. In other configurations, a matching network 705 is not implemented between the antenna 706 and the wireless transceiver 704.

The wireless transceiver 704 and antenna 706 can be configured to enable ear-to-ear communication between the two hearing devices 700A and 700B, as well as communications with an external device (e.g., a smartphone or a digital music player). A battery 710 or other power source (rechargeable or conventional) is provided within the enclosure 701 and is configured to provide power to the various components of the hearing devices 700A and 700B, including the active NFC 707. A speaker or receiver 708 is coupled to an amplifier (not shown) and the processor 702. The speaker or receiver 708 is configured to generate sound which is communicated to the wearer's ear.

In some embodiments, the hearing devices 700A and 700B include a microphone 712 mounted on or inside the enclosure 701. The microphone 712 may be a single microphone or multiple microphones, such as a microphone array. The microphone 712 can be coupled to a preamplifier (not shown), the output of which is coupled to the processor 702. The microphone 712 receives sound waves from the environment and converts the sound into an input signal. The input signal is amplified by the preamplifier and sampled and digitized by an analog-to-digital converter of the processor 702, resulting in a digitized input signal. In some embodiments (e.g., hearing aids), the processor 702 (e.g., DSP circuitry) is configured to process the digitized input signal into an output signal in a manner that compensates for the wearer's hearing loss. When receiving an audio signal from an external source, the wireless transceiver 704 may produce a second input signal for the DSP circuitry of the processor 702 that may be combined with the input signal produced by the microphone 712 or used in place thereof. In other embodiments, (e.g., hearables), the processor 702 can be configured to process the digitized input signal into an output signal in a manner that is tailored or optimized for the wearer (e.g., based on wearer preferences). The output signal is then passed to an audio output stage that drives the speaker or receiver 708, which converts the output signal into an audio output.

Some embodiments are directed to a custom hearing aid, such as an ITC, CIC, or IIC hearing aid. For example, some embodiments are directed to a custom hearing aid which includes a wireless transceiver 704 and an antenna 706 loaded with an NFC 707 and configured to operate in the 2.4 GHz ISM frequency band or other applicable communication band (referred to as the "Bluetooth® band" herein). As was discussed previously, creating a robust antenna arrangement for a 2.4 GHz custom hearing aid represents a significant engineering challenge. A custom hearing aid is severely limited in space, and the antenna arrangement is in close proximity to other electrical components, both of which impact antenna performance. Because the human body is very lossy and a custom hearing aid is positioned within the ear canal, a high performance antenna 706 (e.g., high antenna radiation efficiency and/or wide bandwidth) is particularly desirable. Embodiments of the disclosure are directed to a high performance antenna 706 loaded with an NFC 707.

Figure 8A:
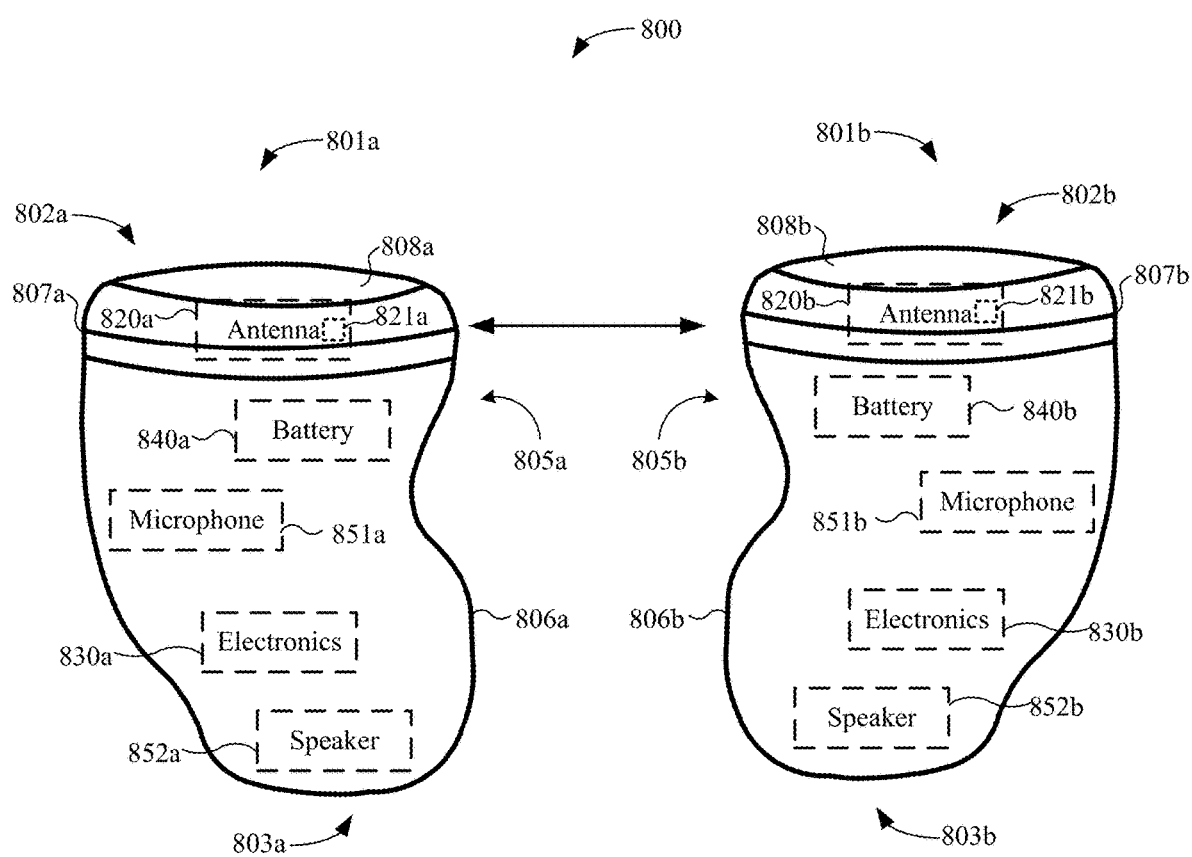
FIGS. 8A and 8B illustrate a custom hearing device system incorporating an antenna loaded with a non-Foster circuit in accordance with any of the embodiments disclosed herein.
Figure 8B:
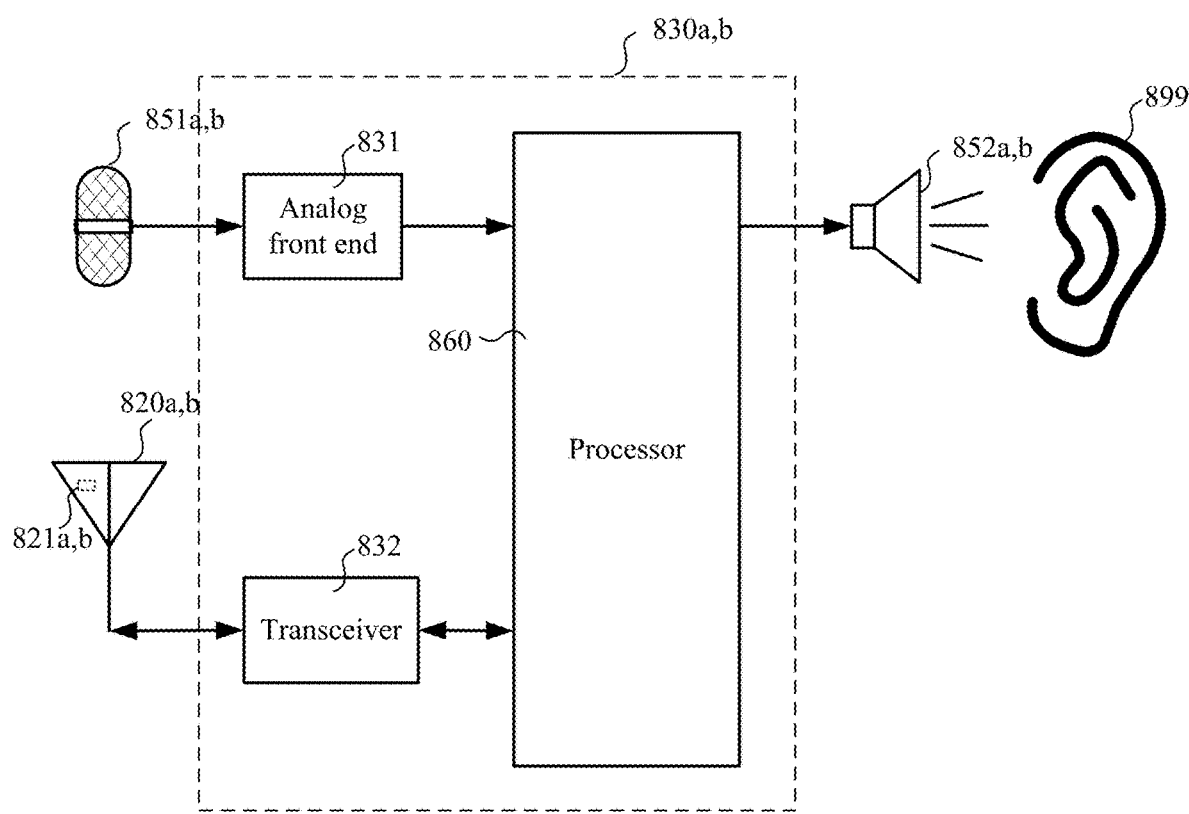

FIGS. 8A and 8B illustrate a custom hearing aid system which incorporates a high performance antenna comprising an NFC in accordance with any of the embodiments disclosed herein. The hearing aid system 800 shown in FIGS. 8A and 8B includes two hearing devices, e.g., left 801a and right 801b side hearing devices, configured to wirelessly communicate with each other and external devices and systems. FIG. 8A conceptually illustrates functional blocks of the hearing devices 801a, 801b. The position of the functional blocks in FIG. 8A does not necessarily indicate actual locations of components that implement these functional blocks within the hearing devices 801a, 801b. FIG. 8B is a block diagram of components that may be disposed at least partially within the enclosure 805a, 805b of the hearing device 801a, 801b.

Each hearing device 801a, 801b includes a physical enclosure 805a, 805b that encloses an internal volume. The enclosure 805a, 805b is configured for at least partial insertion within the wearer's ear canal. The enclosure 805a, 805b includes an external side 802a, 802b that faces away from the wearer and an internal side 803a, 803b that is inserted in the ear canal. The enclosure 805a, 805b comprises a shell 806a, 806b and a faceplate 807a, 807b. The shell 806a, 806b typically has a shape that is customized to the shape of a particular wearer's ear canal. In some configurations, the shell 806a, 806b is fashioned from semi-soft material (e.g., semi-soft polymer) which, when inserted, that takes on the shape of the particular wearer's ear canal.

The faceplate 807a, 807b may include a battery door 808a, 808b or drawer disposed near the external side 802a, 802b of the enclosure 805a, 805b and configured to allow the battery 840a, 840b to be inserted and removed from the enclosure 805a, 805b. An antenna 820a, 820b includes or is otherwise loaded using an NFC 821a, 821b, various configurations of which are illustrated and described herein. The NFC 821a, 821b is an active circuit which draws power from the battery 840a, 840b. The antenna 820a, 820b can be coupled to a matching circuit or a matching circuit can be excluded. The antenna 820a, 820b can be mounted on the faceplate 807a, 807b or another structure of the shell 806a, 806b.

The battery 840a, 840b powers electronic circuitry 830a, 830b which is also disposed within the shell 806a, 806b. As illustrated in FIGS. 8A and 8B, the hearing device 801a, 801b may include one or more microphones 851a, 851b configured to pick up acoustic signals and to transduce the acoustic signals into microphone electrical signals. The electrical signals generated by the microphones 851a, 851b may be conditioned by an analog front end 831 (see FIG. 8B) by filtering, amplifying and/or converting the microphone electrical signals from analog to digital signals so that the digital signals can be further processed and/or analyzed by the processor 860. The processor 860 may perform signal processing and/or control various tasks of the hearing device 801a, 801b. In some implementations, the processor 860 comprises a DSP that may include additional computational processing units operating in a multi-core architecture.

The processor 860 is configured to control wireless communication between the hearing devices 801a, 801b and/or an external accessory device (e.g., a smartphone, a digital music player) via the antenna 820a, 820b loaded with the NFC 821a, 821b. The wireless communication may include, for example, audio streaming, data, and/or control signals. The electronic circuitry 830a, 830b of the hearing device 801a, 801b includes a transceiver 832. The transceiver 832 has a receiver portion that receives communication signals from the antenna 820a, 820b, demodulates the communication signals, and transfers the signals to the processor 860 for further processing. The transceiver 832 also includes a transmitter portion that modulates output signals from the processor 860 for transmission via the antenna 820a, 820b. Electrical signals from the microphone 851a, 851b and/or wireless communication received via the antenna 820a, 820b may be processed by the processor 860 and converted to acoustic signals played to the wearer's ear 899 via a speaker 852a, 852b.

Figure 9A:
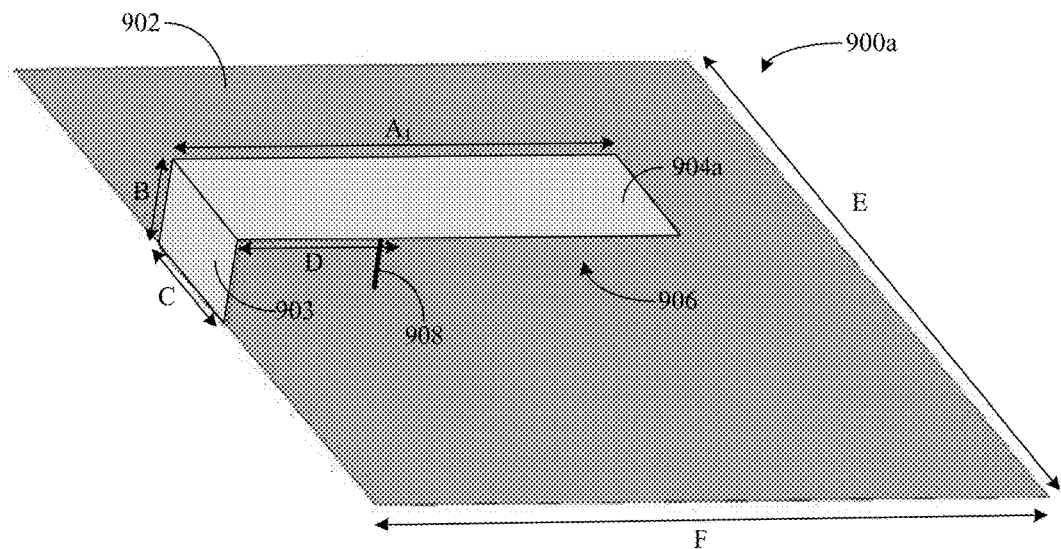
FIGS. 9A and 9B illustrate antennas that were simulated to demonstrate the efficacy of loading the antenna with a non-Foster circuit in accordance with any of the embodiments disclosed herein.
Figure 9B:
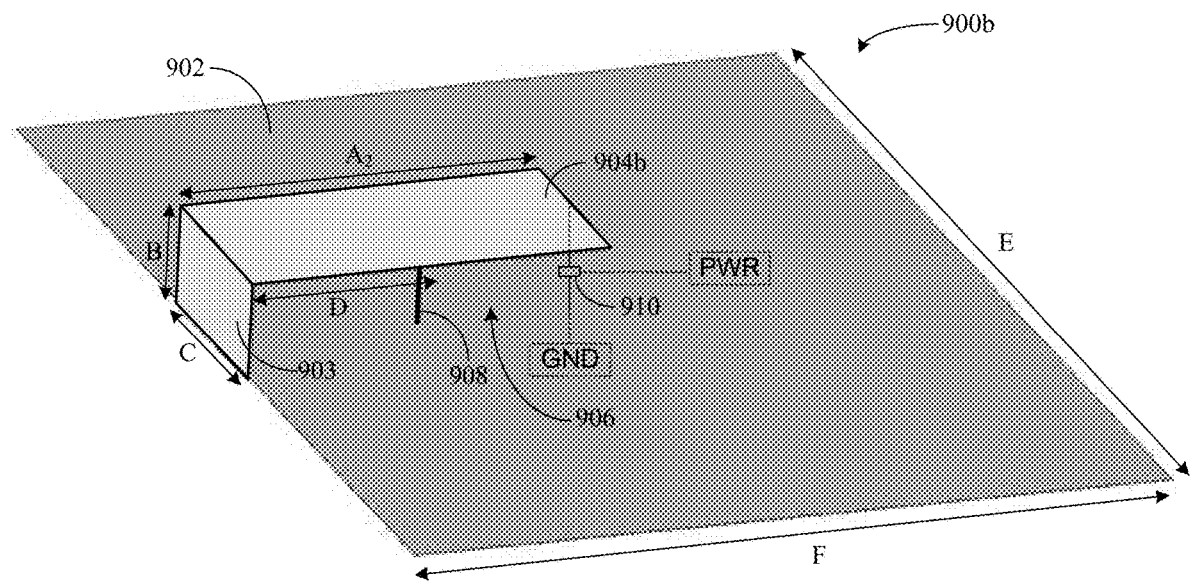

Simulations were performed to evaluate an antenna loaded with an NFC for use in a hearing device. FIGS. 9A and 9B illustrate antennas that were simulated to demonstrate the efficacy of loading the antenna with an NFC in accordance with any of the embodiments disclosed herein. The antennas 900a, 900b shown in FIGS. 9A and 9B are a particular type of patch antenna referred to as a PIFA. Patch antennas, including PIFAs and Inverted-F Antennas (IFAs), also referred to as rectangular microstrip antennas, are low profile and lightweight making them suitable for use in hearing and body-worn devices. Although patch antennas may be three dimensional, they can be generally planar comprising a flat plate over a ground plane separated by a dielectric material. Patch antennas can be built on a printed circuit board (rigid or flexible) where the antenna plate and ground plane are separated by the circuit board material which forms the dielectric. The PIFA is a type of patch antenna that is particularly suited for hearing device applications. PIFA antennas are low profile, and have a generally omnidirectional radiation pattern in free space. The antennas 900a and 900b shown in FIGS. 9A and 9B include a ground plane 902 separated from a conductive patch 904a, 904b. The antennas 900a, 900b include a shorting wall, frame or pin 903 (interchangeably referred to as a shorting member) that shorts the patch 904a, 904b to the ground plane 902. To achieve a desired antenna response, the antennas 900a, 900b may include multiple shorting members, for example. The antennas 904a, 904b were simulated as copper structures on a polyimide substrate having a relative dielectric constant, $\varepsilon_r$, of 4. The antennas 904a, 904b were driven via a feed arrangement comprising a feed arm 908.

The conductive patch 904a of the antenna 900a shown in FIG. 9A had a length of $A_1$ and a width of C. The shorting member 903 had a width of C and a height of B. The shorting member 903 was separated from the feed arm 908 by a spacing D. The ground plane 902 had a first dimension of E and a second dimension of F. In the simulation, the values of these dimensions were set as follows: length $A_1$=15.375 mm, width C=6 mm, height B=3.1 mm, spacing D=6.19 mm, first dimension E=34 mm, and second dimension F=23.43 mm.

Other than the length of the conductive patch 904b, the antenna 900b shown in FIG. 9B had the same dimensions as those of antenna 900a shown in FIG. 9A. However, the length, $A_2$, of the conductive patch 904b was shortened from 15.375 mm to 11.07 mm. As such, the conductive patch 904b of the antenna 900b shown in FIG. 9B was about 30% shorter than the conductive patch 904a of the antenna 900a shown in FIG. 9A. Additionally, the antenna 900b shown in FIG. 9B was loaded with an NFC 910 as shown in FIG. 9B. The NFC 910 simulated a negative inductor having a value of −6.72 nH.

Experiments were performed by simulating placing of the antennas 900a and 900b on a human head. A first simulation evaluated the longer antenna 900a shown in FIG. 9A, and is referred to as the original antenna in Table 1 below. A second simulation evaluated the shortened antenna 900b shown in FIG. 9B (excluding NFC element 910), and is referred to as the capacitive antenna in Table 1 below. In the second simulation, a capacitive loading element having a capacitance of 0.63 pF was added to the antenna 900b at the same location as the NFC element 910. A third simulation evaluated the shortened antenna 900b shown in FIG. 9B, and is referred to as the inductive (non-Foster) antenna in Table 1 below. In the third simulation, a negative inductor (NFC element 910) having an inductance of −6.72 nH was added to the antenna 900b.

Each of these simulations was performed at 2.44 GHz, and the radiation efficiency was measured for each antenna configuration. Table 1 below summarizes the simulation results.

TABLE 1

| Type | Radiation Efficiency (2.44 GHz) |
|---|---|
| Original | −5.1 dB |
| Capacitive | −11.27 dB |
| Inductive (non-Foster) | −5.27 dB |

The results provided in Table 1 above demonstrate that the shorter antenna 900b loaded with an NFC provides performance comparable to a significantly larger antenna 900a. The results provided in Table 1 above also demonstrate that the antenna 900b loaded with an NFC provides a 6 dB improvement in radiation efficiency when placed on-body as compared to the traditional capacitive loading mechanism (e.g., antenna 900b loaded with a capacitive element).

An important feature of an antenna incorporated in a hearing device or body-worn device is its frequency bandwidth. As the antenna gets smaller with respect to its operating wavelength, the frequency bandwidth also gets smaller. Additional simulations were performed to evaluate the frequency bandwidth of an electrically small antenna with traditional passive antenna loading (e.g., the capacitive antenna listed in Table 1 above) and with loading using an NFC element (e.g., the inductive (non-Foster) antenna listed Table 1 above).

Figure 10A:
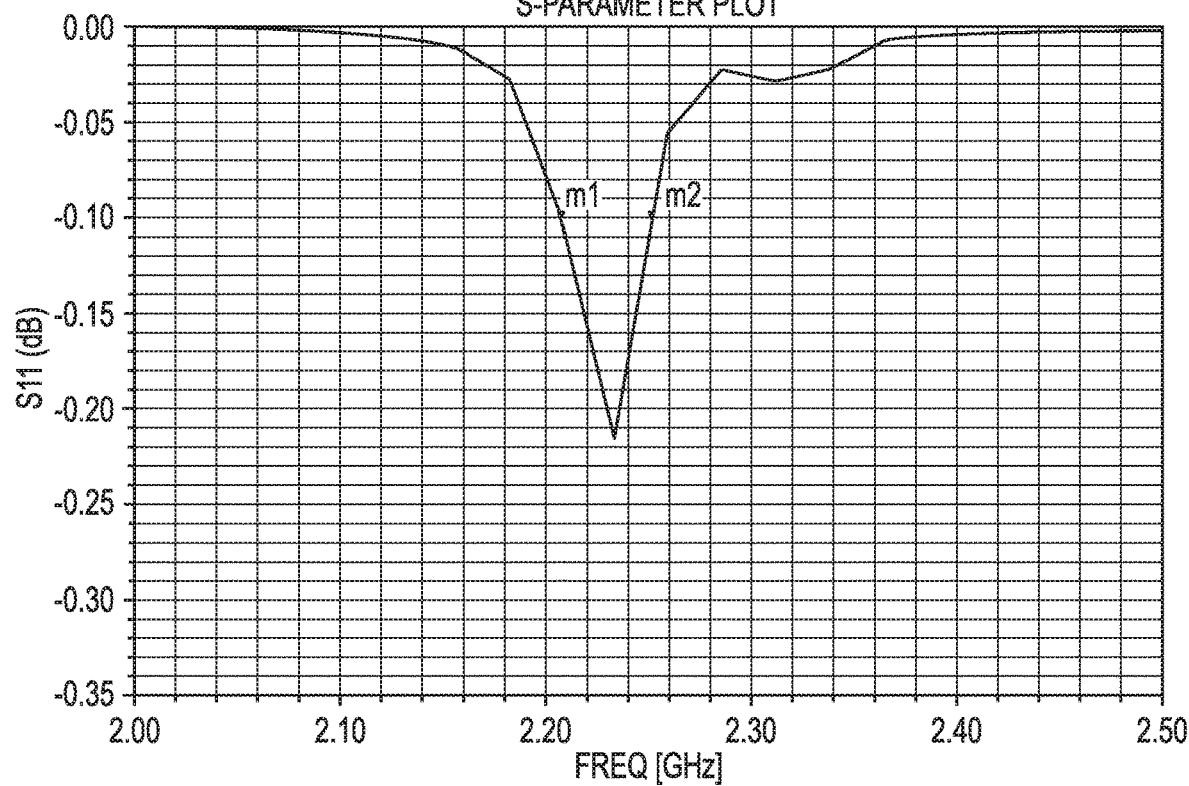
FIG. 10A shows reflection coefficient and bandwidth data for the antenna shown in FIG. 9B with traditional capacitive loading.
Figure 10B:
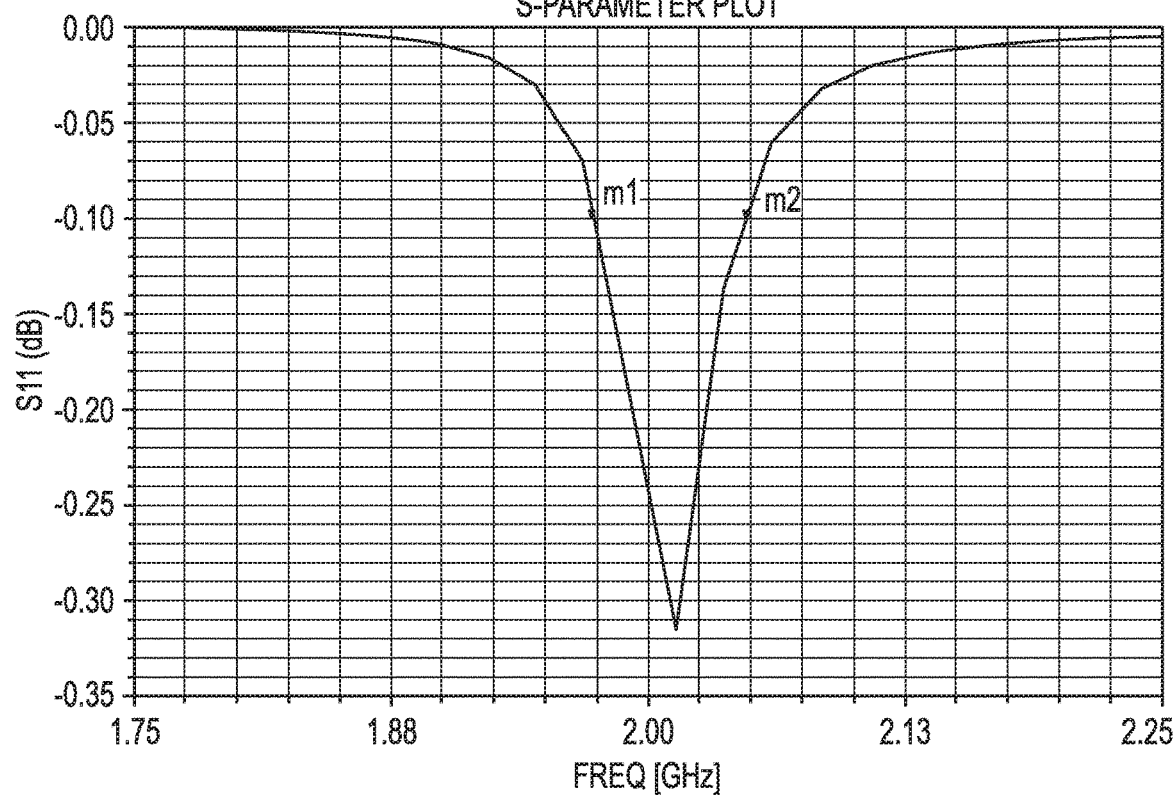
FIG. 10B shows reflection coefficient and bandwidth data for the antenna shown in FIG. 9B loaded with a non-Foster circuit in accordance with any of the embodiments disclosed herein.

Reflection coefficient (S11) data for the antenna with traditional capacitive loading is shown in FIG. 10A. Reflection coefficient data for the antenna with NFC loading is shown in FIG. 10B. The bandwidth for the antenna with traditional capacitive loading was measured as 44.2 MHz. The bandwidth for the antenna with NFC loading was measured as 75 MHz, which is significantly wider than that of the traditional capacitively loaded antenna. It is noted that these bandwidths are for S11=0.1 dB, due to poor matching of the designed antennas. In any of the embodiments disclosed herein, the NFC loading of the antenna can be adjusted to provide a 6 dB bandwidth of about 80 MHz and a center frequency, $f_c$, of 2.44 GHz.

Figure 11:
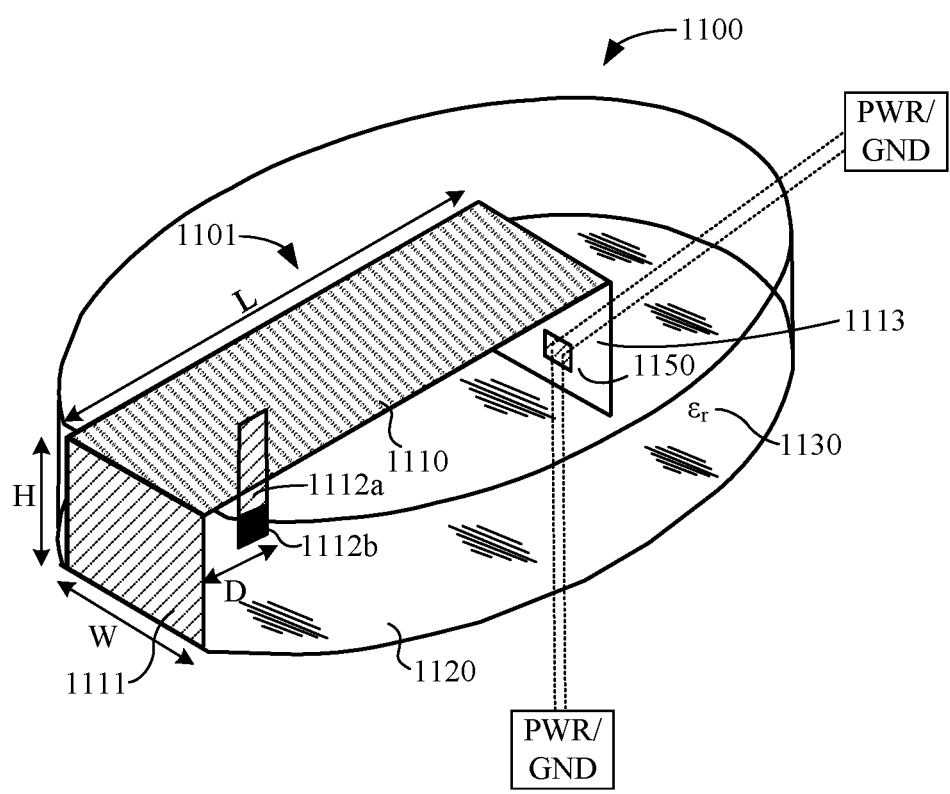
FIG. 11 illustrates an antenna arrangement comprising a Planar Inverted-F Antenna (PIFA) loaded with a non-Foster circuit in accordance with any of the embodiments disclosed herein.

FIG. 11 illustrates an antenna arrangement 1100 comprising a PIFA 1101 loaded with an NFC 1150 in accordance with any of the embodiments disclosed herein. The antenna arrangement 1100 can be incorporated in any hearing device, such as those disclosed herein, and in other body-worn electronic devices. The PIFA 1101 includes a conductive patch 1110 and a ground plane 1120 that overlaps and is spaced apart from the patch 1110. The ground plane 1120 is separated from the conductive patch 1110 by a dielectric 1130. A suitable PCB material for the dielectric 1130 has an isotropic dielectric constant in a range of about 12 to about 13. Materials with a dielectric constant in this range or greater are useful to reduce the physical dimensions of the antenna arrangement when compared, for example, to the physical dimensions of an antenna arrangement that uses air as the dielectric. A shorting member 1111 (e.g., a wall or pin) shorts the patch 1110 to the ground plane 1120. To achieve a desired antenna response, the PIFA 1101 may include multiple shorting pins. A wireless transceiver of the hearing or body-worn device (see items 704 in FIGS. 7A-7B and item 832 in FIG. 8B) is coupled to the PIFA 1101 through a feed arrangement comprising a feed arm 1112a and a feed point 1112b.

The NFC 1150 is physically and electrically connected to the patch 1110 at the terminal end of the patch 1110 opposing the shorting member 1111. For the PIFA configuration shown in FIG. 11, the NFC 1150 is connected at a voltage maximum of the PIFA 1101. According to various embodiments, the NFC 1150 can be designed to be a voltage input device which provides enhanced performance when connected to the patch 1110 at a voltage maximum. The voltage maximum for the PIFA 1110 shown in FIG. 11 is at or near the peripheral terminal edge 1113 of the patch 1110, away from the feed arm/point 1112a/1112b. It is noted that, in other antenna configurations, the NFC can be designed to be a current input device which provides enhanced performance when connected to the antenna at a current maximum (e.g., a location near the antenna feed).

Because the NFC 1150 is an active device, the NFC 1150 is connected to a power source and ground. In some implementations, power and ground connections to the NFC 1150 can be made through the dielectric 1130, as is depicted in FIG. 11. In other implementations, power and ground connections to the NFC 1150 can be made through the ground plane 1120, also as is depicted in FIG. 11, noting that these connections would be electrically isolated from the ground plane 1120.

According to one embodiment, the antenna arrangement 1100 is configured for incorporation in a custom ITC shell, such as a hearing device shell of the type shown in FIG. 8A.

According to this embodiment, the PIFA 1101 has a maximum length L, width W, and height H of 8.826 mm, 3.4798 mm, and 2.5146 mm, respectively. The distance, D, from the feed arm 1112a to the shorting wall 1111 is 1.3 mm. The feed arm 1112a is shown positioned W/2 mm away from the sides of the patch 1110 (e.g., in the center), but can be positioned at non-centered locations. The feed arm 1112a electrically connects with the patch 1110 and the ground plane 1120. The feed point 1112b is a rectangular patch of 0.6 mm×0.6 mm. The substrate material 1130 is Rogers TMM 13i ($\varepsilon_r$=12.85–13.2, loss tangent=0.002) available from Rogers Corporation (www.rogerscorp.com), with 0.5 oz. copper on each side. The NFC 1150 can be configured as a negative inductor. The antenna arrangement 1100 incorporating the NFC 1150 and having dimensions specified above can be configured to provide a 6 dB bandwidth of about 80 MHz with a center frequency, $f_c$, of 2.44 GHz, and a relatively high radiation efficiency for an antenna of this size.

An antenna arrangement comprising an NFC and configured for use in a hearing device or other body-worn device can incorporate various types of antennas. For example, and with reference to FIG. 12, a hearing device or other body-worn device can incorporate a dipole antenna arrangement 1200 which includes a dipole antenna 1201 and a pair of NFC's 1204, 1208. The dipole antenna 1201 includes a first conductive element 1202 connected to a first feed point 1210 and a second conductive element 1206 connected to a second feed point 1212. A first NFC 1204 is connected at the terminal end of the first conductive element 1202, and a second NFC 1208 is connected at the terminal end of the second conductive element 1206. It is understood that the first and second NFCs 1204, 1208 need not be connected at the terminal ends of the first and second conductive elements 1202, 1206. For example, optimal placement of the first and second NFCs 1204, 1208 can be anywhere along the first and second conductive elements 1202, 1206. In some embodiments, the dipole antenna 1201 can be a meandered dipole antenna. The antenna arrangement 1200 is driven by a radio transceiver coupled to the first and second feed points 1210, 1212.

Figure 12:
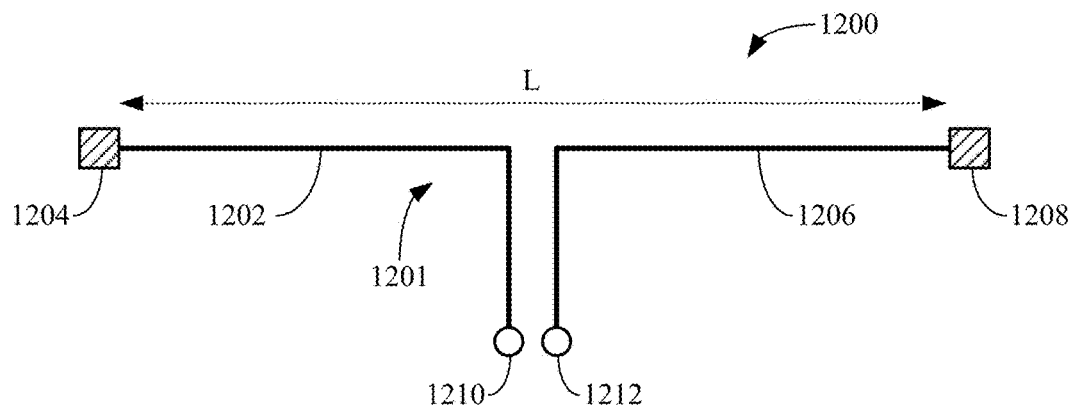
FIG. 12 illustrates an antenna arrangement comprising a dipole antenna loaded with non-Foster circuits in accordance with any of the embodiments disclosed herein.

A typical dipole antenna is configured as a center-fed half-wave dipole which would typically have an electrical length of about half the operating wavelength. A hearing device having a wireless transceiver designed to operate at 2.44 GHz, for example, may not be large enough to accommodate a dipole antenna having a physical length of about half the operating wavelength ($\lambda/2$). The physical length of the dipole antenna 1201 shown in FIG. 12 can be dramatically reduced by incorporating NFCs 1204 and 1208. For example, the physical length, L, of the dipole antenna 1201 can be reduced from $\lambda/2$ (without NFC loading) to about $\lambda/5$ to $\lambda/10$, for example. When energized, the NFCs 1204, 1208 operate to cancel out a positive sloped reactance over a wide band of frequencies (e.g., an 80 MHz bandwidth with $f_c$=2.44 GHz). The NFCs 1204, 1208 can operate as negative inductors, for example. Dipole antennas incorporating NFC's as shown in FIG. 12 can be incorporated in a wide variety of hearing devices, including various in-ear and in-canal devices (ITE, ICC, IIC devices).

Figure 13A:
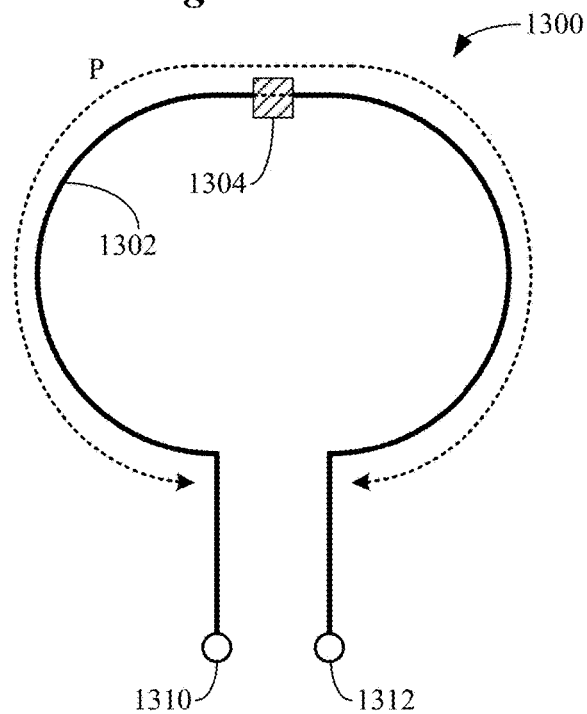
FIGS. 13A and 13B illustrate an antenna arrangement comprising a PIFA loaded with a non-Foster circuit in accordance with any of the embodiments disclosed herein.

FIG. 13A illustrates another type of antenna which can include an NFC and be configured for use in a hearing device, including various in-ear and in-canal devices, or other body-worn device. The antenna arrangement 1300 includes a loop antenna 1302 and an NFC 1304 connected to the loop antenna 1302. Although shown as having a generally circular shape, the loop antenna 1302 need not be circular. For example, the loop antenna 1302 can be configured to have an elliptical, square, rectangular, or any general-closed curve shape.

The loop antenna 1302 includes a first feed point 1310 and a second feed point 1312, which can be connected to a radio transceiver of the hearing device. The NFC 1304 can be connected to the loop antenna 1302 at a current maximum or a voltage maximum, depending whether the NFC 1304 is configured as a voltage input device or a current input device. The connection location of the NFC 1304 on the loop antenna 1302 is typically dependent on the operating wavelength and the electrical length of the antenna 1302.

The perimeter of a typical loop antenna is designed to have a physical length of $\lambda$, where $\lambda$ is the operating wavelength. Connecting the NFC 1304 to the loop antenna 1302 can dramatically reduce the perimeter of the antenna 1302. For example, the perimeter, P, of the loop antenna 1302 can be reduced from $\lambda$ (without NFC loading) to about $\lambda/5$ to $\lambda/10$, for example. Loop antennas incorporating an NFC as shown in FIG. 13A can be incorporated in a wide variety of hearing devices, including various in-ear and in-canal devices (ITE, ICC, IIC devices).

Figure 13B:
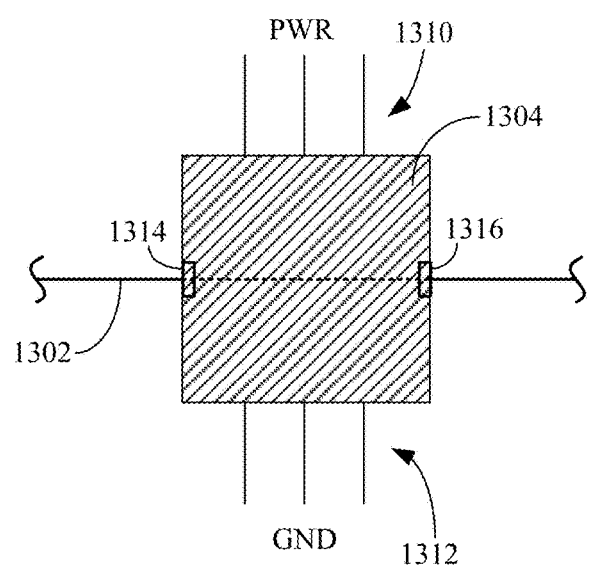

FIG. 13B shows additional details of the NFC 1304 connected to the loop antenna 1302. As was previously discussed, the NFC 1304 includes one or more active circuits which require one or more power lines 1310 and one or more ground lines 1312. The NFC 1304 includes an input 1314 and an output 1316 respectively connected to the loop antenna 1302. When energized, the NFC 1304 operates to cancel out a positive sloped reactance over a wide band of frequencies (e.g., an 80 MHz bandwidth with fc=2.44 GHz). The NFC 1304 can operate as a negative inductor, for example. It is noted that the power, ground, and input/output connection configurations illustrated in FIG. 13B can be used and modified as needed for NFCs shown in other figures.

Figure 14:
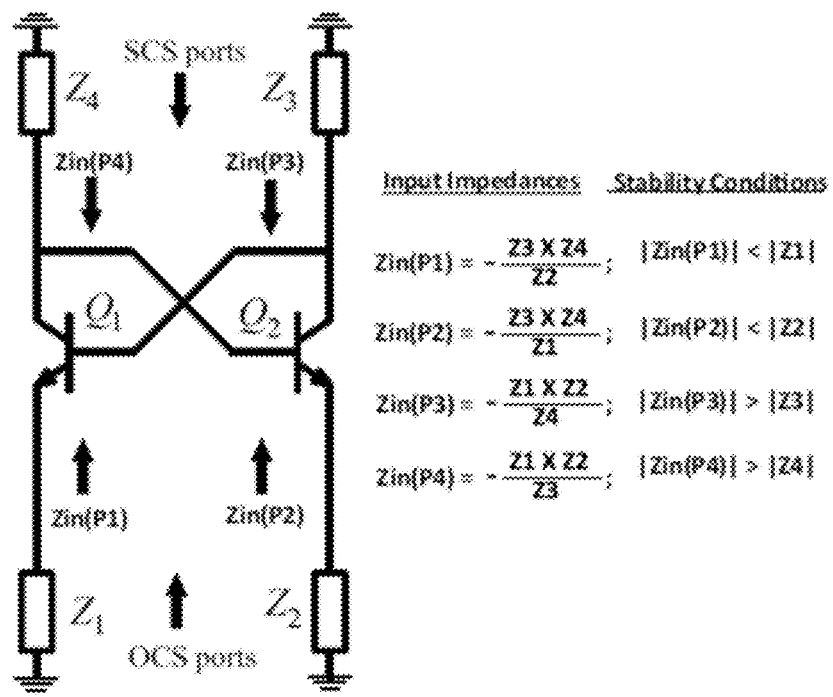
FIG. 14 shows a representative non-Foster circuit implemented as a Negative Impedance Convertor circuit in accordance with any of the embodiments disclosed herein.

The NFCs described hereinabove can be implemented using a variety of circuit topologies. In general, active circuits that generate non-Foster impedances work on the basic principle of inverting the current through a load while maintaining the voltage across it, or inverting the voltage across a load while maintaining the current through it, leading to a negated load impedance. According to various implementations, an NFC of a type described herein can be implemented as a Negative Impedance Convertor (NIC) circuit, an example of which is shown in FIG. 14. FIG. 14 shows the circuitry topology of a representative NIC circuit with associated input impedance and stability conditions. The NIC circuit shown in FIG. 14 can be configured either as a one-port network (unbalanced) to be used as a shunt element, or as a two-port network (balanced) to be used as a floating series element.

The NIC circuit shown in FIG. 14 employs a cross-coupled transistor topology to negate an attached RLC network, and has a positive feedback network. The positive feedback network can lead to instability unless the NIC circuit is properly loaded with the required impedances to ensure stability. There are two basic conditions for stability: (1) If the input to the NIC circuit is at the emitter of the transistor, the NIC circuit will be open circuit stable (OCS) by ensuring that the NIC circuit sees an open circuit at its input; (2) If the input to the NIC circuit is at the base-collector junction, the NIC circuit will be short circuit stable (SCS) by ensuring that the NIC circuit sees a short circuit at its input. It is noted that these are the extreme conditions. Stability can usually be achieved by connecting a load with a larger impedance magnitude than that of the input impedance at the OCS ports, and by connecting a load with a smaller impedance magnitude than that of the input impedance at the SCS ports. It is noted that care should be taken to ensure that the impedance conditions are satisfied throughout the bandwidth of operation of the NIC circuit.

Figure 15A:
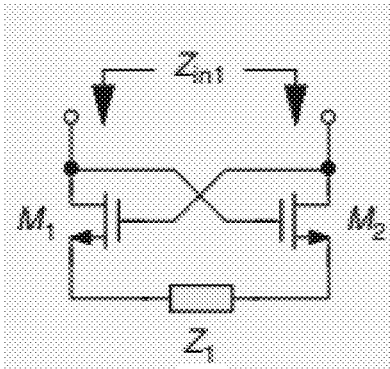
FIGS. 15A and 15B show a representative non-Foster circuit implemented as a cross-coupled pair circuit in accordance with any of the embodiments disclosed herein.
Figure 15B:
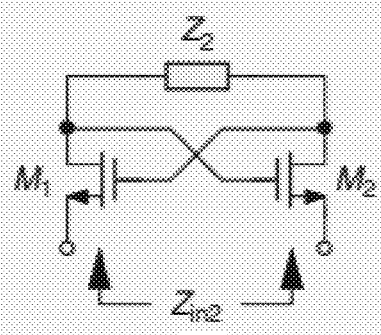

According to other implementations, an NFC of the type described herein can be implemented as a cross-coupled pair circuit, an example of which is shown in FIGS. 15A and 15B. Because of its internal positive feedback, the cross-coupled pair NFC shown in FIGS. 15A and 15B operates as an impedance negator. The cross-coupled pair produces an impedance of $Z_{in1}=-Z_1-2/g_m$ between the drains or $Z_{in2}=-Z_2+2/g_m$ between the sources. If $Z_1$ is a capacitor, for example, $Z_{in1}$ contains a negative capacitance, allowing the cancellation of positive capacitance at the drains. Similarly, if $Z_1$ is an inductor, for example, $Z_{in1}$ contains a negative inductance, allowing the cancellation of positive inductance at the drains.

The specific configuration of an antenna of an ear-worn electronic device is generally dependent on a number of factors, including the space available in a particular ear-worn electronic device and the particular antenna performance requirements. Due to the performance benefit and small size, an antenna loaded with an NFC may be incorporated in devices beyond ear-worn electronic devices where device size significantly limits antenna size. Other devices that can incorporate an antenna loaded with an NFC in accordance with the present disclosure include, but are not limited to, fitness and/or health monitoring watches or other wrist worn or hand-held objects, e.g., Apple Watch®, Fitbit®, cell phones, smartphones, handheld radios, medical implants, hearing aid accessories, wireless capable helmets (e.g., used in professional football), and wireless headsets/headphones (e.g., virtual reality headsets). Each of these devices is represented by the system block diagram of FIG. 7A or 7B, with the components of FIGS. 7A and 7B varying depending on the particular device implementation. Also, in any of the embodiments disclosed herein, one or more NFCs can be implemented to perform multi-reactive-element compensation of more complex antenna impedances (e.g., those show in FIGS. 3 and 4). These embodiments can be extended to a filter "impedance-inverter", for example.

This document discloses numerous embodiments, including but not limited to the following:

Item 1 is an ear-worn electronic device configured to be worn by a wearer, comprising:

a housing configured to be supported by, at, in or on an ear of the wearer;

electronic circuitry disposed in the housing and comprising a radio frequency transceiver and a power source;

an antenna disposed in, on, or extending from the housing and operably coupled to the transceiver; and a non-Foster circuit operably connected to the antenna and coupled to the power source, the non-Foster circuit configured to actively load the antenna and provide a negative reactance that offsets a reactance of the antenna.

Item 2 is the device of item 1, wherein the non-Foster circuit is connected to the antenna at a voltage maximum of the antenna.

Item 3 is the device of item 1, wherein the non-Foster circuit is configured to provide a negative inductance.

Item 4 is the device of item 1, wherein the non-Foster circuit is configured to actively load the antenna so as to achieve a bandwidth beyond a Bode-Fano limit.

Item 5 is the device of item 1, wherein the non-Foster circuit is configured to actively load the antenna so as to achieve a bandwidth of about 80 MHz centered at about 2.44 GHz.

Item 6 is the device of item 1, wherein the non-Foster circuit is configured to resonate the antenna.

Item 7 is the device of item 1, wherein the antenna is configured as an electrically small antenna.

Item 8 is the device of item 1, wherein the antenna comprises a planar inverted-F antenna. Item 9 is the device of item 1, wherein the antenna comprises a loop antenna.

Item 10 is the device of item 1, wherein the antenna comprises a dipole antenna.

Item 11 is the device of item 1, wherein the ear-worn electronic device is configured as a completely-in-the-canal (CIC) device.

Item 12 is an ear-worn electronic device configured to be worn by a wearer, comprising:

a housing configured to be supported at, by, in or on the wearer's ear;

a processor and a power source disposed in the housing;

a speaker or a receiver coupled to the processor;

a radio frequency transceiver disposed in the housing and coupled to the processor;

a planar inverted-F antenna disposed in, on, or extending from the housing and operably coupled to the transceiver, the planar inverted-F antenna comprising a radiating patch having a first end connected to a shorting member and an opposing second end, the shorting member connected to a ground plane and a feed arm spaced from the shorting member and connected to the patch and the ground plane, a dielectric disposed between the patch and the ground plane; and a non-Foster circuit operably connected to the antenna and the power source, the non-Foster circuit configured to actively load the antenna and provide a negative reactance that offsets a reactance of the antenna.

Item 13 is the device of item 12, wherein the non-Foster circuit is connected to the antenna at a voltage maximum of the antenna.

Item 14 is the device of item 12, wherein the non-Foster circuit is connected to the second end of the patch.

Item 15 is the device of item 12, wherein the non-Foster circuit is configured to provide a negative inductance.

Item 16 is the device of item 12, wherein the non-Foster circuit is configured to actively load the antenna so as to achieve a bandwidth beyond a Bode-Fano limit.

Item 17 is the device of item 12, wherein the non-Foster circuit is configured to actively load the antenna so as to achieve a bandwidth of about 80 MHz centered at about 2.44 GHz.

Item 18 is the device of item 12, wherein the non-Foster circuit is configured to resonate the antenna.

Item 19 is the device of item 12, wherein the antenna is configured as an electrically small antenna.

Item 20 is the device of item 12, wherein the ear-worn electronic device is configured as a completely-in-the-canal (CIC) device.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electromagnetic signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-worn electronic device configured to be worn by a wearer, comprising:
   a housing configured to be supported by, at, in or on an ear of the wearer;
   electronic circuitry disposed in the housing and comprising a radio frequency transceiver and a power source;
   an antenna disposed in, on, or extending from the housing and operably coupled to the transceiver; and
   a non-Foster circuit operably connected to the antenna and coupled to the power source, the non-Foster circuit configured to actively load the antenna and provide a negative reactance that offsets a reactance of the antenna, wherein the non-Foster circuit is directly connected to the antenna at a voltage maximum of the antenna.

2. The device of claim 1, wherein the non-Foster circuit is configured to provide a negative inductance.

3. The device of claim 1, wherein the non-Foster circuit is configured to actively load the antenna so as to achieve a bandwidth beyond a Bode-Fano limit.

4. The device of claim 1, wherein the non-Foster circuit is configured to actively load the antenna so as to achieve a bandwidth of about 80 MHz centered at about 2.44 GHz.

5. The device of claim 1, wherein the non-Foster circuit is configured to resonate the antenna.

6. The device of claim 1, wherein the antenna is configured as an electrically small antenna.

7. The device of claim 1, wherein the antenna comprises a planar inverted-F antenna.

8. The device of claim 1, wherein the antenna comprises a loop antenna.

9. The device of claim 1, wherein the antenna comprises a dipole antenna.

10. The device of claim 1, wherein the ear-worn electronic device is configured as a completely-in-the-canal (CIC) device.

11. An ear-worn electronic device configured to be worn by a wearer, comprising:
    a housing configured to be supported at, by, in or on the wearer's ear;
    a processor and a power source disposed in the housing;
    a speaker or a receiver coupled to the processor;
    a radio frequency transceiver disposed in the housing and coupled to the processor;
    a planar inverted-F antenna disposed in, on, or extending from the housing and operably coupled to the transceiver, the planar inverted-F antenna comprising a radiating patch having a first end connected to a shorting member and an opposing second end, the shorting member connected to a ground plane and a feed arm spaced from the shorting member and connected to the patch and the ground plane, a dielectric disposed between the patch and the ground plane; and
    a non-Foster circuit operably connected to the antenna and the power source, the non-Foster circuit configured to actively load the antenna and provide a negative reactance that offsets a reactance of the antenna.

12. The device of claim 11, wherein the non-Foster circuit is connected to the antenna at a voltage maximum of the antenna.

13. The device of claim 11, wherein the non-Foster circuit is connected to the second end of the patch.

14. The device of claim 11, wherein the non-Foster circuit is configured to provide a negative inductance.

15. The device of claim 11, wherein the non-Foster circuit is configured to actively load the antenna so as to achieve a bandwidth beyond a Bode-Fano limit.

16. The device of claim 11, wherein the non-Foster circuit is configured to actively load the antenna so as to achieve a bandwidth of about 80 MHz centered at about 2.44 GHz.

17. The device of claim 11, wherein the non-Foster circuit is configured to resonate the antenna.

18. The device of claim 11, wherein the antenna is configured as an electrically small antenna.

19. The device of claim 11, wherein the ear-worn electronic device is configured as a completely-in-the-canal (CIC) device.

\* \* \* \* \*